United States Patent
Cox et al.

[11] Patent Number: 5,922,451
[45] Date of Patent: Jul. 13, 1999

[54] PLASTICIZED SHEETS, LAMINATES MADE FROM SUCH SHEETS, AND PROCESS FOR PREPARING SUCH LAMINATES

[75] Inventors: Stephen Todd Cox, Kingsport; Robert Lee Bradley, Jr., Johnson City; Paul Jay Kennedy, Kingsport; Guy Fostine Massie, Jr., Kingsport; Melvin Glenn Mitchell, Kingsport; Freddie Wayne Williams, Kingsport, all of Tenn.

[73] Assignee: Eastman Chemical Company, Kingsport, Tenn.

[21] Appl. No.: 08/730,651

[22] Filed: Oct. 11, 1996

[51] Int. Cl.$^6$ .............. B32B 5/16; B32B 23/08; B32B 39/00
[52] U.S. Cl. .......... 428/323; 428/511; 428/537.5
[58] Field of Search ................ 428/526, 527, 428/530, 531, 532–537.5, 542.2, 542.6, 542.8, 323, 511; 162/146, 157.6; 156/60; 264/319, 324

[56] References Cited

U.S. PATENT DOCUMENTS

| | | |
|---|---|---|
| 1,829,585 | 10/1931 | Dreyfus et al. . |
| 2,887,429 | 5/1959 | Griggs et al. . |
| 2,976,205 | 3/1961 | Snead et al. . |
| 3,372,084 | 3/1968 | Arledter . |
| 5,631,078 | 5/1997 | Ellery et al. ............... 428/311.71 |
| 5,766,752 | 6/1998 | Cox et al. ............... 428/322.2 |

FOREIGN PATENT DOCUMENTS

| | | |
|---|---|---|
| 29 01 143 | 7/1980 | Germany . |
| 49-124172 | 11/1974 | Japan . |
| WO 97 16599 | 5/1997 | WIPO . |
| WO 97 20985 | 6/1997 | WIPO . |

OTHER PUBLICATIONS

Database WPI, Section Ch, Week 7542, Derwent Publications Ltd., London, GB; Class A11, AN 75–69459 XP002053714 & JP 49 124 172 A (Daicel Ltd), Nov. 27, 1974, see abstract.

Sharipdzhanov et al (A. Sharipdzhanov, I. M. Abdiraimov, and M. M. Gulyamova, Plast. Massy., 4, 24–25 (1992).

*Primary Examiner*—Mary E. Mosher
*Attorney, Agent, or Firm*—Charles R. Martin; Harry J. Gwinnell

[57] ABSTRACT

A decorative paper sheet for use in preparing a decorative laminate is made up of a matrix containing from about 15 to about 60 weight percent of cellulose and from about 40 to about 85 weight percent of cellulose acetate. The sheet also contains a plasticizer for the cellulose acetate in an amount ranging from about 40 to about 90 weight percent based on the weight of the cellulose acetate in said matrix. A filler material may be present in the sheet in an amount ranging from about 1 to about 18 weight percent based on the weight of the matrix. A low pressure laminate may be made from sheet and a structural substrate therefor by application of heat and pressure. The plasticized cellulose acetate fuses and resolidifies to bond the sheet to the structural substrate.

16 Claims, No Drawings

PLASTICIZED SHEETS, LAMINATES MADE FROM SUCH SHEETS, AND PROCESS FOR PREPARING SUCH LAMINATES

FIELD OF THE INVENTION

The present invention relates generally to plasticized sheets and to laminates made from such sheets. In particular, the plasticized sheets include cellulose acetate and a plasticizer enabling the sheet to be bonded to a substrate. Even more particularly the present invention relates to the field of low pressure decorative laminates.

BACKGROUND OF THE INVENTION

Low pressure decorative laminates generally are laminated articles comprising an overlay sheet and a structural substrate consolidated or bonded together into a unit or a structure as a result of the application of heat and temperature. The overlay sheet may be a decorative sheet made up of a high quality paper bearing some sort of indicia or decoration.

In the past, laminated structure have been prepared using both high pressure and low pressure procedures. In each case, the sheet which is bonded to the substrate generally is first impregnated with a thermosetting resin such as, for example, a melamine or urea formaldehyde resin, and the laminated structure is completed by applying heat and pressure sufficient to bond the sheet to the substrate.

A significant problem encountered during such prior art processing involves the production of volatile organics, such as formaldehyde, during the bonding operation. This is an expensive and sometime inefficient processing procedure.

SUMMARY OF THE INVENTION

In accordance with the invention, a new type of low pressure laminate is provided through the utilization of a paper sheet which contains cellulose acetate. The cellulose acetate is a thermoplastic resin. The paper, as prepared, includes a plasticized cellulose acetate component which may be used in lieu of the melamine and/or urea formaldehyde resins that are used currently in the production of low pressure laminates. Bonding of the sheet to the desired substrate is accomplished through the fusing and rehardening of the cellulose acetate. Clearly the undesirable production of volatile organic materials during the bonding cycle is reduced through the use of the plasticized cellulose acetate containing sheet of the invention.

As mentioned above, the invention provides novel laminated structures comprised of a structural substrate and a plasticized sheet bonded to the substrate. Currently, low pressure laminates are prepared using a sheet of paper made up of cellulose and having a weight of approximately 80 grams per square meter. Such a sheet is then saturated with a mixture of melamine and urea formaldehyde resins. At the completion of the saturation cycle, the sheet has a basis weight of approximately 180 grams per square meter. The saturated sheet is then placed on the desired substrate and subjected to a heat and pressure cycle, which upon completion, provides the desired bonding and surface characteristics for the low pressure laminate. The bi-products of this cure cycle are volatile organics, such as formaldehyde, that must be removed and disposed of properly. The present invention enhances the manufacturing process by eliminating process steps, such as the collection and disposal of volatile organics and the impregnation of the paper with the resin. Also, the invention reduces environmental concerns created by the evolution of volatile organics.

The purposes and objects of the invention are achieved through the provision of a plasticized sheet for use in preparing a laminated structure. The sheet comprises a matrix including from about 15 to about 60 weight percent of cellulose and from about 40 to about 85 weight percent of cellulose acetate. The sheet also comprises a plasticizer for the cellulose acetate. The plasticizer is broadly present in the sheet in an amount ranging from about 40 to about 90 weight percent based on the weight of the cellulose acetate in the matrix.

In a preferred form of the invention, the plasticized sheet also comprises a filler material which is present in the sheet in an amount ranging from about 1 to about 15 and preferably from about 4 to about 12 weight percent based on the weight of the matrix.

In accordance with the more preferred forms of the invention, the sheet may include from about 50 to about 73 weight percent of cellulose acetate and from about 27 to about 50 weight percent of cellulose.

With regard to the plasticizer, the preferred amount of the plasticizer in the sheet may range from about 53 to about 78 weight percent based on the weight of the cellulose acetate in the matrix.

In a particularly preferred form of the invention, the plasticized sheet of the invention comprises a matrix which includes from about 55 to about 65 weight percent of cellulose acetate and from about 35 to about 45 weight percent of cellulose. In this aspect of the invention, the sheet also preferably comprises from about 60 to about 70 weight percent of the plasticizer based on the weight of the cellulose acetate in the matrix and from about 6 to about 10 weight percent of a filler material based on the total weight of the matrix.

In yet another preferred form of the invention, the plasticized sheet of the invention may comprise a paper sheet formed from cellulose fibers and cellulose acetate fibers. Ideally, the cellulose acetate fibers may comprise fibers which include a cellulose acetate inner core encased in a cellulose shell. In accordance with the invention, the plasticized sheet may comprise a decorative sheet.

In another aspect of the invention, a process for preparing a laminated structure is provided. In such process, a sheet is prepared which comprises a matrix including from about 15 to about 60 weight percent of cellulose and from about 40 to about 85 weight percent of cellulose acetate. The sheet is contacted with a plasticizer for the cellulose acetate so as to produce a plasticized sheet therefrom which contains from about 40 to about 90 weight percent of the plasticizer based on the weight of the cellulose acetate in the matrix. A structural substrate is provided for the sheet and the sheet is placed on the structural substrate so as to present a layered structure. The layered structure is then subjected to a temperature in the range of from about 150° C. to about 185° C. and a laminating pressure in the range of from about 300 psi to about 450 psi for a period of time in a range of from about 5 seconds to about 90 seconds, to thereby produce a low pressure laminated structure.

And yet a further aspect of the invention, a laminated structure is provided. The structure comprises a structural substrate and a plasticized sheet that is bonded to the substrate. The plasticized sheet may comprise a matrix including from about 15 to about 60 weight percent of cellulose and from about 40 to about 85 parts by weight of cellulose acetate and a plasticizer for the cellulose acetate. The plasticizer may be present in the sheet in an amount ranging from about 40 to about 90 weight percent based on the weight of the cellulose acetate in the matrix.

DETAILED DESCRIPTION OF THE PREFERRED EMBODIMENTS OF THE INVENTION

The invention specifically provides a new low pressure laminate that includes a paper sheet containing cellulose acetate. The sheet includes a matrix containing both cellulose and cellulose acetate fibers. The cellulose acetate concentration may range from 40 to 85 percent by weight of the weight of the matrix. The sheet also includes a plasticizer that is compatible with cellulose acetate. Pigments and dyes may or may not be used to enhanced opacity. The cellulose acetate containing paper may be used as a solid color or printed to obtain a desired pattern.

As has been described above, the present invention relates to sheets which may be defined as "paper" sheets. The term "paper" refers to a web structure which contains cellulose and optionally other additives and is produced on continuous conventional paper making apparatus. Examples of sheets which are beyond the meaning of "paper", but are included within the broad scope of the invention, may include, for example, such things as extruded film, thermoset laminates, woven substrates, and injection molded substrates, etc.

Cellulose acetate is a thermoplastic resin which provides thermoplastic properties that may be used for bonding the paper to a structural substrate. Thus, novel low pressure laminates may be manufactured without the use of melamine and/or urea formaldehyde resins such as those which are currently used in the industry. The plasticized cellulose acetate fuses and resolidifies to provide the needed substrate bonding whereby the volatile organic content of the materials subjected to the manufacturing process is reduced. The processing conditions useful in connection with the present invention include those conditions which are conventionally used in the low pressure laminate industry. In addition to reducing the environmental impact of the industry procedures, the present invention also reduces the number of processing steps as compared to the present conventional techniques. This results from the fact that the cellulose acetate containing paper may be pre-plasticized. Thus, the need for saturation stations for resin impregnation is eliminated thereby reducing manufacturing costs.

In accordance with the invention, a plasticized sheet for use in preparing a laminated structure is provided. The plasticized sheet includes a matrix containing both cellulose and cellulose acetate. The sheet may be a sheet of paper formed using conventional paper making processes wherein the fibers which make up the sheet matrix comprise both cellulose fibers and cellulose acetate fibers. Ideally, the paper may be produced by a process comprising slurring a mixture of cellulose and cellulose acetate fibers, confricting the slurry, diluting the confricted slurry, preparing a paper from the diluted confricted slurry, dewatering the paper and drying the paper. Such steps are now conventional in the paper making industry. The cellulose used to prepare the paper may be conventional paper making cellulose obtained from wood, cotton, hemp, bagasse, straw, flax and other plant source. Both hardwood and softwood may be used to prepare the paper used in accordance with the present invention.

The cellulose acetate fibers may be similar to those which have been used for many years to prepare many products such as wearing apparel and tobacco smoke filters. In addition, cellulose acetate fibers have previously been combined with cellulosic pulp in the manufacture of paper products as disclosed in U.S. Pat. Nos. 3,057,755, 4,731,091, 4,040,856, and 5,102,501 and in chemical abstracts 73:121691 s.

Cellulose acetate fibers useful in the practice of the present invention are well known in the art and can be prepared as a continuous band by solution spinning of cellulose acetate dissolved in acetone to prepare the continuous band and then applying a lubricant to facilitate further mechanical handling of the band. Cellulose acetate fibers useful in accordance with the present invention may also be prepared from a band called a filter tow of cellulose acetate fibers which are useful for preparation of tobacco smoke filters. Such cellulose acetate fibers typically contain about 0.5 weight percent titanium dioxide pigment, about 1 weight percent lubricant and about 6 weight percent water. The fibers are then cut to a suitable length which is typically in the range of ⅛ inch to ¾ inch. These fibers may be prepared, for example, in accordance with the processes described in copending application Ser. No. 08/245,117 filed May 17, 1994, herein incorporated by reference.

Cellulose acetate fibers useful for textile applications may also be used to prepare the sheets of the present invention. Such cellulose acetate fibers often are provided in the form of a continuous strand of fibers or filaments, typically called a yarn.

In a particularly preferred form of the invention, the cellulose acetate fibers may consist of cored cellulose acetate fibers. The cored cellulose acetate fibers comprise a sheath of cellulose and a core of cellulose acetate. The sheath may be a fibrillated surface of regenerated cellulose that is produced by the reaction of cellulose acetate fibers with a base such as sodium hydroxide. Such a reaction replaces the acetyl groups on the surface of the cellulose acetate fiber with hydroxyl groups thereby creating a fiber with a cellulose surface and cellulose acetate core.

The sheath generally may constitute about 4 to about 15 weight percent of the fiber weight, which may also be expressed as 6.3 to 22.2 acetyl group removal and 2.4 to 8.5 weight percent fiber loss. A minimum of 4 weight percent regenerated cellulose is generally required to provide a cored cellulose acetate fiber having desired cellulose behavior. Copending application Ser. No. 08/375,140 filed Jan. 19, 1995, herein incorporated by reference, discloses the cored cellulose acetate fibers and a preferred process for production thereof.

In general, the paper sheet which is useful in accordance with the present invention may comprise a matrix including from about 15 to about 60 weight percent of cellulose and from about 40 to about 85 weight percent of cellulose acetate. Thus, the cellulose fibers and the cellulose acetate fibers must be mixed in the paper making slurry in relative quantities such that the desired weight ratio of cellulose to cellulose acetate is achieved. More specifically, the matrix may preferably include from about 27 to about 50 weight percent of cellulose and from about 50 to about 73 weight percent of cellulose acetate. Ideally, the matrix should include from about 35 to about 45 weight percent of cellulose and from about 55 to about 65 weight percent of cellulose acetate.

The sheet useful in connection with the present invention should also include a plasticizer for the cellulose acetate. The plasticizer generally should be present in the sheet in an amount ranging from about 40 to about 90 weight percent based on the weight of the cellulose acetate in the matrix. More specifically, the plasticizer may be present in the sheet in an amount ranging from about 53 to about 78 weight percent based on the weight of the cellulose acetate in the matrix. And ideally, the plasticizer should be present in the sheet in an amount ranging from about 60 to about 70 weight percent based on the weight of the cellulose acetate in the matrix.

Examples of plasticizers which are suitable for plasticizing cellulose acetate in accordance with the invention include triacetin, diethyl phthalate, triphenyl phosphate, N-ethyl-toluenesulfonamide, dimethyl phthalate, diethyl sebacate, ethylene glycol dibutyrate, benzophenone, diamyl phthalate, dibutyl succinate, ethylene glycol diacetate, tricresyl phosphate, and the like. The plasticizer may preferably be included in the sheet during the paper-making process to thereby present a plasticized sheet. In this aspect of the invention, the plasticizer may simply be added to the slurry of the cellulose and cellulose acetate fibers during the paper-making process. Alternatively, the plasticizer may be added to the paper sheet using a gravure coater. Furthermore, the plasticizer may be applied to the sheet using a dipping procedure involving dipping of the sheet into a plasticizer solution. In each case, a plasticized sheet comprising (a) a matrix including cellulose and cellulose acetate fibers and (b) a plasticizer is provided.

If desired, the plasticized sheet may be filled with a conventional filler such as, for example, calcium carbonate (precipitated and ground), titanium dioxide, clay (alpha and beta), aluminum oxide, talc, aluminum silicate, iron oxide, glass beads, polyurethane beads, and etc.

The plasticized paper sheet may be used in preparing a laminated structure. Thus, the plasticized sheet, which may be a sheet of decorative paper, is cut to the same size as a structural substrate. Using conventional low pressure laminate manufacturing equipment, the decorative paper is laid on top of the substrate and the layered structure is placed in a static press. The layered structure in the press is then subjected to pressing for the specified time and at the specified temperature and pressure, and then the laminated structure is immediately removed from the press. Generally speaking, no cooling is required.

The present invention also contemplates the use of a continuous operation using appropriate continuous production equipment. In such continuous processing, the plasticized decorative paper and substrate may thus be continually pressed under the specified conditions.

In accordance with the invention, the pressing temperature may range from about 150° C. to about 185° C., the pressing pressure may range from about 300 to 400 psi and the pressing time may range from about 5 to about 90 seconds. These times, temperatures and pressures may be manipulated in a manner well known to those skilled in the art to which the present invention pertains, depending on the characteristics of the plasticized sheet and the substrate and the desired characteristics of the laminate.

The following examples exemplify certain specific procedures for producing laminated structures in accordance with the invention.

EXAMPLES

Example 1

A sheet of paper was prepared utilizing conventional paper-making procedures. The sheet of paper had a basis weight of 45 pounds per 3000 square feet. The sheet consisted of 60 parts by weight of cellulose acetate fibers, 25 parts by weight of cellulose fibers, 15 parts by weight of a titanium dioxide filler material and 46.8 parts by weight of an N-ethyl-toluenesulfonamide plasticizer for the cellulose acetate. The sheet was positioned on a piece of ¾ inch thick particle board and pressed using a "hot-to-hot" press cycle at a temperature of 150° C. and a pressure of 350 psi for 90 seconds. The thus produced laminated structure was inspected and found to be suitable for use as a decorative laminate.

Example 2

In this example, a decorative sheet having a basis weight of 45 pounds per 3000 square feet was produced by conventional paper-making procedures. The sheet consisted of 60 parts by weight cellulose acetate, 40 parts by weight cellulose fibers and 50.4 parts by weight of an N-ethyl-toluenesulfonamide plasticizer for the cellulose acetate. The decorative sheet was positioned on a piece of 3.4 inch thick particle board and pressed using the same conditions as specified in accordance with example no. 1. Once again a laminated structure useful as a decorative laminate was produced.

We claim:

1. A process for preparing a laminated structure comprising:
   (A) preparing a sheet comprising a matrix including from about 15 to about 60 weight percent of cellulose, from about 40 to about 85 weight percent of cellulose acetate, and from about 1 to about 15 weight percent of a filler material based on the total weight of said matrix,
   (B) contacting said sheet with a plasticizer for said cellulose acetate so as to produce a plasticized sheet therefrom which contains from about 40 to about 90 weight percent of said plasticizer based on the weight of the cellulose acetate in said matrix,
   (C) providing a structural substrate for said sheet,
   (D) placing said sheet on said structural substrate so as to present a layered structure, and
   (E) subjecting the layered structure to a temperature in the range of from about 150° C. to about 185° C. and a laminating pressure in the range of from about 300 psi to about 450 psi for a period of time in the range of from about 5 seconds to about 90 seconds, to thereby produce a laminated structure.

2. A process as set forth in claim 1, wherein said sheet is a decorative sheet.

3. A process as set forth in claim 1, wherein said sheet comprises from about 4 to about 12 weight percent of said filler material based on the total weight of said matrix.

4. A process as set forth in claim 1, wherein said matrix includes from about 27 to about 73 weight percent of cellulose and from about 50 to about 73 weight percent of cellulose acetate.

5. A process as set forth in claim 1, wherein said sheet is contacted with said plasticizer for said cellulose acetate so as to produce a plasticized sheet therefrom which contains from about 53 to about 78 weight percent of said plasticizer based on the weight of the cellulose acetate in said matrix.

6. A process as set forth in claim 1, wherein said matrix includes from about 35 to about 45 weight percent of cellulose and from about 55 to about 65 weight percent of cellulose acetate, wherein said sheet comprises from about 6 to about 10 weight percent of said filler material based on the total weight of said matrix, and wherein said sheet is contacted with said plasticizer for said cellulose acetate so as to produce a plasticized sheet therefrom which contains from about 60 to about 70 percent weight of said plasticizer based on the weight of the cellulose acetate in said matrix.

7. A process as set forth in claim 1, wherein said sheet comprises a paper sheet formed from cellulose fibers and cellulose acetate fibers.

8. A process as set forth in claim 7, wherein said cellulose acetate fibers comprise fibers which include a cellulose acetate inner core encased in a cellulose shell.

9. A laminated structure comprising a structural substrate and a plasticized sheet bonded to said substrate, said plasticized sheet comprising (a) a matrix including from about 15 to about 60 weight percent of cellulose and from about 40 to about 85 parts by weight of cellulose acetate; (b) a plasticizer for said cellulose acetate, said plasticizer being present in said sheet in an amount ranging from about 40 to about 90 weight percent based on the weight of said cellulose acetate in the matrix; and (c) a filler material, said filler material being present in the sheet in an amount ranging from about 1 to about 15 weight percent based on the total weight of said matrix; said laminated structure being free of melamine and/or urea formaldehyde resins.

10. A laminated structure as set forth in claim 9, wherein said plasticized sheet comprises a filler material, said filler material being present in the sheet in an amount ranging from about 4 to about 12 weight percent based on the total weight of said matrix.

11. A laminated structure as set forth in claim 9, wherein said matrix includes from about 50 to about 73 weight percent of said cellulose acetate and from about 27 to about 50 weight percent of said cellulose.

12. A laminated structure as set forth in claim 9, wherein said plasticized sheet comprises from about 53 to about 78 weight percent of said plasticizer based on the weight of said cellulose acetate in said matrix.

13. A laminated structure as set forth in claim 12, wherein said matrix includes from about 55 to about 65 weight percent of said cellulose acetate and from about 35 to about 45 weight percent of said cellulose, and wherein said sheet comprises from about 60 to about 70 weight percent of said plasticizer based on the weight of the cellulose acetate in the matrix and from about 6 to about 10 weight percent of said filler material based on the total weight of the matrix.

14. A laminated structure as set forth in claim 9, wherein said plasticized sheet comprises a paper sheet formed from cellulose fibers and cellulose acetate fibers.

15. A laminated structure as set forth in claim 14, wherein said cellulose acetate fibers comprise fibers which include a cellulose acetate inner core encased in a cellulose shell.

16. A laminated structure as set forth in claim 14, wherein said sheet comprises a decorative sheet.

* * * * *